United States Patent [19]
Toyoshima et al.

[11] Patent Number: 6,011,526
[45] Date of Patent: Jan. 4, 2000

[54] DISPLAY APPARATUS OPERABLE IN SYNCHRONISM WITH A MOVEMENT OF THE BODY OF A VIEWER

[75] Inventors: Kenichiro Toyoshima; Hirofumi Usui, both of Tokyo, Japan

[73] Assignee: Sony Corporation, Tokyo, Japan

[21] Appl. No.: 08/833,792

[22] Filed: Apr. 9, 1997

[30] Foreign Application Priority Data

Apr. 15, 1996 [JP] Japan ............................. P08-092424

[51] Int. Cl.[7] ........................................... G09G 5/00

[52] U.S. Cl. ................. 345/7; 345/156; 345/158; 359/13

[58] Field of Search .................... 345/7, 8, 156, 345/157, 158; 359/13, 630

[56] References Cited

U.S. PATENT DOCUMENTS

| 5,062,136 | 10/1991 | Gattis et al. | 380/18 |
| 5,646,640 | 7/1997 | Gove | 345/8 |
| 5,742,264 | 4/1998 | Inagaki et al. | 345/7 |

*Primary Examiner*—Lun-Yi Lao
*Assistant Examiner*—Kent Chang
*Attorney, Agent, or Firm*—Jay H. Maioli

[57] ABSTRACT

The invention provides a display apparatus which operates in a synchronized relationship with a movement of the body of a viewer. A movement amount or a turning angle of the entire body or a part of the body of a viewer such as, for example, a movement of the eye-balls or a turning angle of the head, is detected by a sensor, and a portion of an original image is extracted and displayed in response to a magnitude of the detected movement amount or turning angle. Simultaneously, an audio signal is processed based on the information from the sensor so that an audio image may be formed at a normal position corresponding to the displayed image.

9 Claims, 8 Drawing Sheets

DISPLAY APPARATUS OPERABLE IN SYNCHRONISM WITH A MOVEMENT OF THE BODY OF A VIEWER

BACKGROUND OF THE INVENTION

This invention relates to a display apparatus such as, for example, a head mounted display (HMD) apparatus or a television receiver which reproduces and displays a video signal in the form of a digital signal transmitted and received as a compressed signal used, for example, in satellite broadcasting and/or outputs sound, and more particularly to a display apparatus which calculates a turning angle, an amount of movement of the head of a viewer in the direction of the visual point and so forth, extracts and reproduces an image supplied with the aspect ratio of 16:9 or 4:3 on the real time taking an amount of movement of the image and processes audio information in response to the amount of movement to provide the feeling of presence to the viewer at a comparatively low cost.

In the field of the image technology of AV (audio-visual) apparatus or AV systems, an image reproduction method is conventionally known wherein an image being observed by a viewer is varied in response to a turning movement of the head or some other movement of the viewer.

Meanwhile, the MPEG2 format of a data compression system for processing an image of a moving object have been standardized in the world, and data encoders and data decoders conforming to the standards have been marketed already. An MPEG decoder has a PAN & SCAN function. This function writes region designating information representative of an aspect ratio of a display screen in a header part of a video signal defined on the MPEG2 decoder to designate an aspect ratio of a display image.

Making use of this function, it is possible to extract image information of the aspect ratio of 4:3 from compressed image information of the aspect ratio of 16:9 of the MPEG2 format.

On the other hand, in the field of the audio technology of AV apparatus, a method is known wherein, as disclosed in Japanese Patent Laid-Open Application No. Heisei 7-95698 entitled "Audio Reproduction Apparatus" assigned to the same assignee of the present invention, when sound collected in stereo is to be reproduced by means of a headphone, the left and right acoustic outputs of the headphone are corrected with impulse responses stored in a memory in advance in response a turning angle of the head of a listener.

Further, as a sensor for detecting a movement amount or a turning angle of the body of a person, various sensors are known including such a digital angle detector which makes use of a horizontal component of force of the terrestrial magnetism as disclosed in Japanese Patent Laid-Open Application No. Heisei 7-95698 mentioned hereinabove, and a sensor which employs a gyro.

However, according to the conventional image processing apparatus described above, in principle, a turning angle of the head of a person is detected by means of a sensor, and a special video signal which corresponds to a number of images several to several tents times a display screen of an AV apparatus is processed in synchronism with the speed of the turning movement based on the turning angle information from the sensor. Consequently, a very large memory capacity and a high processing speed are demanded, and this makes an obstacle to minimization and reduction in weight and in cost of an AV apparatus, which is a first problem of the conventional image processing method.

It is a second problem of the conventional image processing apparatus that a displacement is produced between normal positions of a video image and an audio image. In particular, where a fixed type image reproduction apparatus wherein an image is not varied by a movement of the head of a person like a television receiver or the like having an ordinary CRT display tube is used in combination with a headphone wherein the normal position of an audio image is varied by a movement of the head of a person, since only the normal position of the audio image is varied in response to a movement of the head, depending upon the accuracy or the like of a gyro sensor which detects the turning angle of the head, a displacement is possibly produced between the position of a video image and the normal position of the audio image.

Also where a head mounted display unit wherein a video image is not varied by a movement of the head is used in combination with a headphone of the type described above, when the head is moved, the video image is not varied, and consequently, the position of the video image is displaced from the normal position of the audio image.

It is to be noted that the normal position of an audio image signifies the position of a virtual sound source formed in the head of a viewer when the viewer listens to an audio signal originally adjusted so as to be reproduced from an audio outputting apparatus such as a loudspeaker or the like using a headphone, such as, for example, a front right position, a front left position or a front central position.

SUMMARY OF THE INVENTION

It is an object of the present invention to provide a display apparatus operable in synchronism with a movement of the body of a viewer which solves the problems described above and eliminates a possible displacement between the normal positions of a video image and an audio image with a comparatively low cost.

In order to attain the object described above, according to the present invention, there is provided a display apparatus operable in a synchronized relationship with a movement of a body of a viewer, comprising display means for displaying a portion of an original image on a screen, means for detecting a movement amount or a turning angle of at least a part of a body of a viewer of the display means, and video processing means for extracting a portion of the original image in response to a magnitude of the detected movement amount or turning angle and supplying the extracted portion of the original image to the display means.

The display apparatus may further comprise audio reproduction means, and audio processing means connected to the audio reproduction means for processing an audio signal in response to the magnitude of the detected movement amount or turning angle so that sound may be outputted from a position corresponding to the image extracted by the video processing means.

The display apparatus may be constructed such that the original image is obtained by reproduction of a compressed digital video signal, and the image processing means decodes a portion of the digital video signal to extract the portion of the original image.

In the display apparatus, since a portion of an original image to be displayed is extracted from the original image in response to a movement of a part of the body of a viewer such as the eye-balls or a movement of the entire body and the extracted image is displayed, the screen can be varied in response to a movement of the body such as, for example, the eye-balls. Consequently, the display apparatus is advantageous in that it can display an image which provides a promoted feeling of presence.

Further, since also the sound is varied in response to the varied screen so that the normal positions of the image observed by the viewer and an audio image formed in the head of the viewer may conform with each other, the display apparatus is advantageous also in that it can construct, for example, a virtual real space which includes sound and an image which conform with each other and provides a good feeling of presence to the viewer of the display apparatus.

Further, since the display apparatus can be constructed without requiring any complicated structure, an otherwise possible displacement between video and audio images can be eliminated in an AV apparatus as the display apparatus which includes an existing headphone and an existing MPEG2 decoder chip by which, for example, the position of an audio image can be varied.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Appearances of different AV systems as display apparatus to which the present invention is applied are shown in FIGS. 1A and 1B, 2 and 3.

Figure 1A:
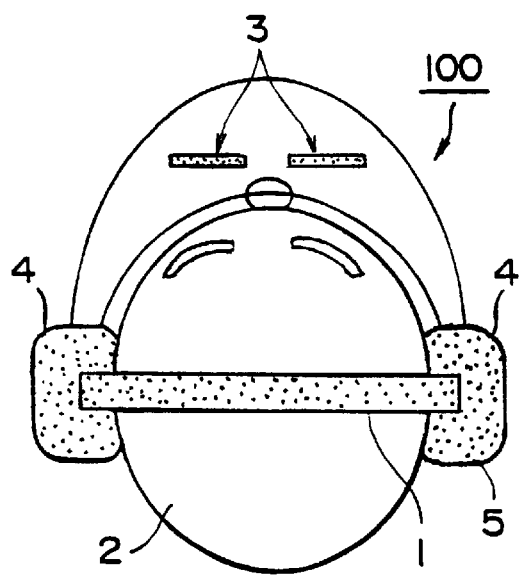
FIGS. 1A and 1B are a schematic top plan view and a schematic side elevational view showing an AV system to which the present invention is applied.
Figure 1B:
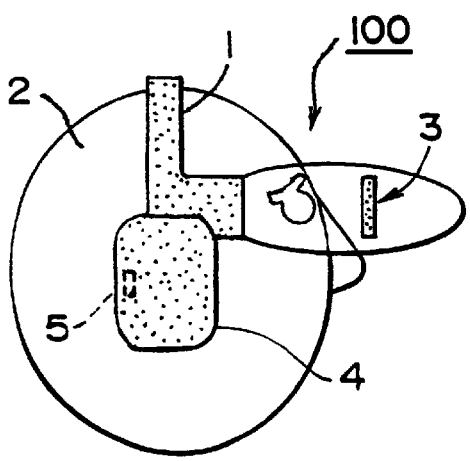

Referring first to FIGS. 1A and 1B, the video display apparatus shown is an AV system 100 which includes a display unit of the head fixed type, that is, a head mounted display (HMD) unit. The AV system 100 has a head set structure by which it is fixed to the head of a viewer 2 by means of some support structure 1 such as a head band, and includes a display unit 3 provided in front of the two eyes of the viewer 2 for displaying a predetermined image on a screen, a stereo headphone 4 including two sounding elements for contacting with the left and right ears of the viewer 2, and a gyro sensor 5 for detecting a movement of the head of the viewer 2.

An image displayed on the display unit 3 is an image in a certain partial region of a "horizontally elongated full image region" (hereinafter referred to as original image), and if the viewer 2 is turned, for example, in the rightward direction, the region of the image displayed on the display unit 3 in the original image moves in the rightward direction by an amount of movement corresponding to the turning movement of the head.

Generally, two different methods are available to extract an image to be displayed from an original image.

Figure 4A:
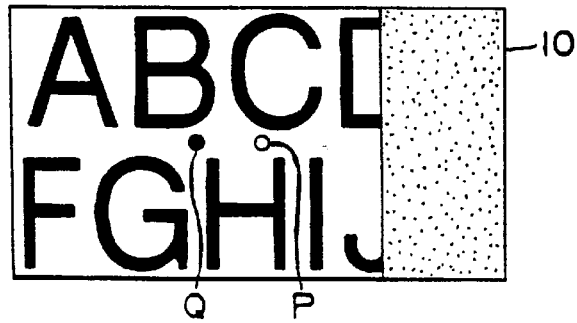
FIGS. 4A, 4B and 4C are schematic illustrations showing different examples of a blanking display.
Figure 4B:
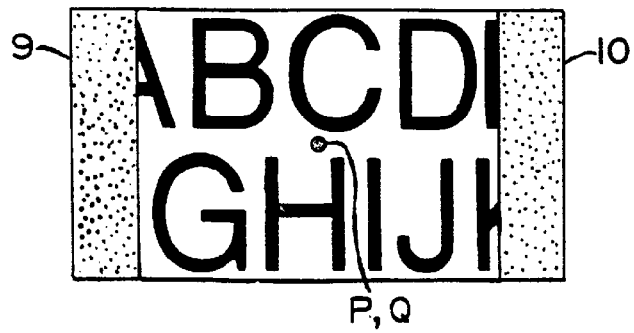
Figure 4C:
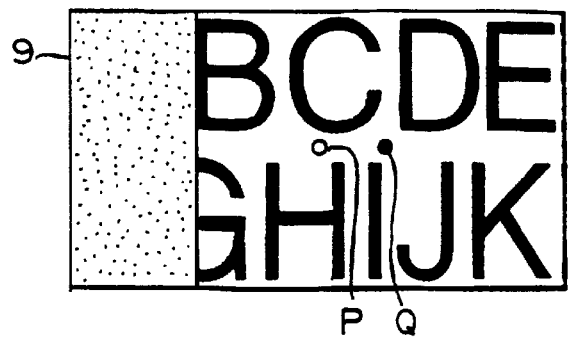

(1) According to the first technique for extracting an image to be displayed from an original image, a blanking portion 9 or 10 is provided at a left or right end portion of the original image as shown in FIG. 4A, 4B or 4C so that an image of a desired region is displayed consequently.

In particular, if the amount of variation of the turning angle of the head exhibits a movement in the leftward direction, then the blanking portion 10 on the right side is set with a comparatively large width while the blanking portion 9 on the left side is set with a comparatively small width or with no width as seen in FIG. 4A.

If the amount of variation of the turning angle of the head is zero and the head does not move leftwardly or rightwardly, then the blanking portions 9 and 10 at the left and right end portions are set equal to each other as seen in FIG. 4B.

On the other hand, if the amount of variation of the turning angle of the head exhibits a movement in the rightward direction, then the blanking portion 9 on the left side is set with a comparatively large width while the blanking portion 10 on the right side is set with a comparatively small width or with no width as seen in FIG. 4C.

In this manner, a construction wherein the widths of the blanking portions 9 and 10 on the left and right ends of the screen are varied in response to an amount of movement of the turning angle of the head so that it looks as if the screen displayed were moved in response to the amount of movement of the turning angle of the head can be realized.

Figure 5A:
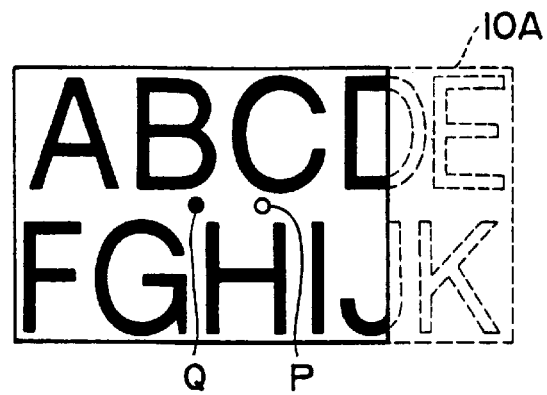
FIGS. 5A, 5B and 5C are schematic illustrations showing different examples of an extraction display.
Figure 5B:
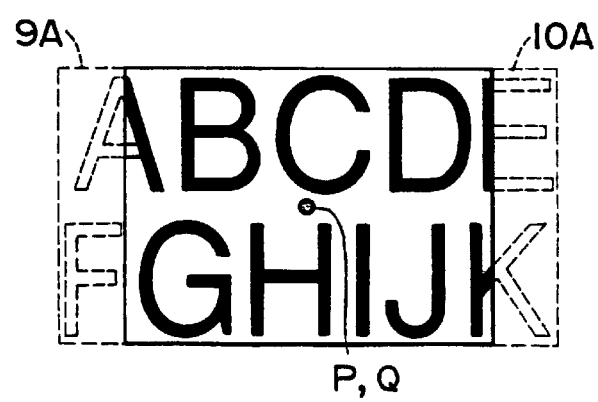
Figure 5C:
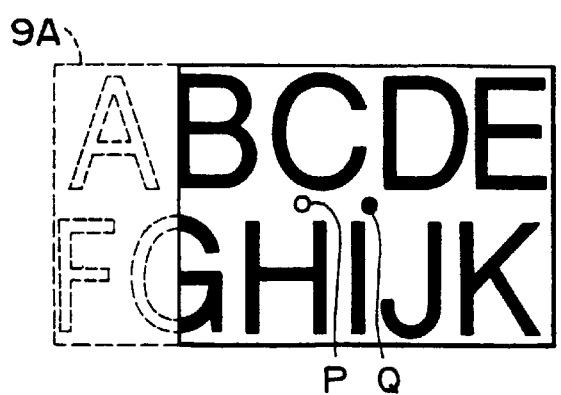

(2) According to the second technique for extracting an image to be displayed from an original image, an image of a desired region is extracted from the original image and displayed in such a manner as shown in FIGS. 5A, 5B and 5C. This technique is based on the PAN & SCAN function which is a standard of a format function of a compressed transmission/reception signal according to the MPEG2 format employed in satellite broadcasting in Japan, which will be hereinafter described. According to the MPEG2 format, a digital video signal of the aspect ratio of 16:9 is divided into 256 segments and includes a control signal indicative of the start and the end of each of the divided video signals, and an image is extracted and displayed in accordance with the control signal in response to an amount of a turning angle of the head of a viewer.

In particular, if the turning angle of the head exhibits an amount of movement in the leftward direction, then the control signal indicating a start and an end is used to extract a control signal of a left side portion is extracted as seen in FIG. 5A so that an image portion 10A on the right side may not be displayed. As a result, an image of a left side portion of the original image is displayed on the screen.

On the other hand, if no amount of movement of the turning angle of the head is detected, then an image which does not include left and right image portions 9A and 10A is displayed as seen in FIG. 5B. Thus, an image at the center of the original image is extracted and displayed.

Or, if the turning angle of the head exhibits an amount of movement in the rightward direction, then an image which does not include an image portion 9A on the left side of the original image is displayed. Consequently, a right side portion of the original image is extracted and displayed.

In this manner, similarly to the first technique wherein the widths of the blanking portions 9 and 10 shown in FIGS. 4A to 4C are varied, if an image is extracted and displayed to vary the screen display such that images at the left and right ends of the original image are cut away in response to an amount of movement of the turning angle of the head, then the screen display can be varied in response to the turning movement of the head of the viewer.

Figure 2:
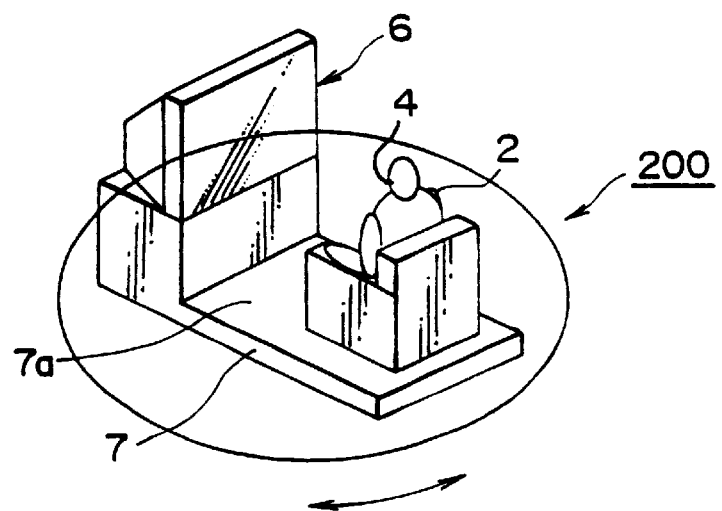
FIG. 2 is a schematic perspective view showing an another AV system to which the present invention is applied.

Referring now to FIG. 2, there is shown another display apparatus to which the present invention is applied. The display apparatus is an AV system 200 which includes a display unit integrated with a viewer. The AV system 200 includes a stereo headphone 4 attached to the head of a viewer 2 similarly as in the display apparatus of FIGS. 1A and 1B, and a display unit 6 of the screen type. The display unit 6 is secured to an end portion of a structure 7. The viewer 2 can be seated on a viewing seat in the form of a sofa secured to the other end portion of the structure 7 while facing the screen of the display unit 6. The viewing seat on the structure 7 is turned integrally with the display unit 6 serving as a display section.

The structure 7 can be turned in the opposite leftward and rightward directions as indicated by a double-sided arrow mark around a center axis 7a and detects a turning angle in the leftward or rightward direction. Accordingly, when the structure 7 is turned, the display unit 6 and the viewer 2 move simultaneously with each other while the viewer 2 observes an image on the display unit 6 without turning the head or the like thereof. If the structure 7 is turned, for example, in the rightward direction, then an image region to be displayed on the display unit 6 is moved in the rightward direction in the original image by an amount corresponding to the amount of movement caused by the turning movement of the entire body. Where the body of the viewer positioned forwardly of the screen is turned integrally in the leftward or rightward direction and an image is extracted from the original image as seen from FIGS. 4A to 4c or 5A to 5C to vary the screen display in such a manner as described above, even when the entire body of the viewer is physically moved in the leftward or rightward direction without turning the head, a screen which provides a feeling of presence to the viewer can be displayed. It is to be noted that, if audio processing is performed so as to establish synchronism with the varying screen display, a normal position of an audio image conforming to the varying screen display can be obtained.

Here, the normal position of the audio image signifies, as described in the description of the background of the invention hereinabove, the position of a virtual sound source formed in the head of a viewer when the viewer listens to an audio signal originally adjusted so as to be reproduced from an audio outputting apparatus such as a loudspeaker or the like using a headphone, such as, for example, a front right position, a front left position or a front central position.

It is to be noted that, while, in the display apparatus of FIG. 2, the turning angle of the center axis 7a of the structure 7 is detected, for example, the stereo headphone 4 may include an integral gyro sensor in order to detect a turning angle of a viewer.

Figure 3:
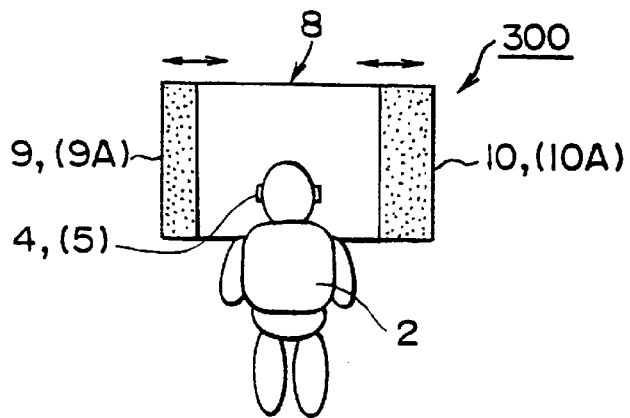
FIG. 3 is a schematic elevational view showing a further AV apparatus to which the present invention is applied.

Referring now to FIG. 3, there is shown a further display apparatus to which the present invention is applied. The display apparatus is an AV system 300 which includes a floor type display unit such as, for example, a television receiver.

The AV system 300 includes a stereo headphone 4 and a gyro sensor 5 attached to the head of a viewer 2 similarly as in the display apparatus of FIGS. 1A and 1B, and an ordinary television receiver 8 as a floor type display unit which includes a display section for displaying an image on a screen and a sound outputting section for outputting sound.

The gyro sensor 5 corresponds to a sensor element which is provided on an arbitrary one of viewers present forwardly of the display section of the television receiver 8 and detects a variation amount of a turning angle of a viewing direction. The gyro sensor 5 may be formed integrally with the stereo headphone 4 or may otherwise be attached to a portion of the body of the viewer only if it can detect the viewing direction of the viewer.

In this instance, an image of the aspect ratio of, for example, 16:9 which corresponds to the full screen of the television receiver 8 is used as an original image, and by providing the blanking portions 9 and 10 of variable widths on the opposite left and right sides of the original image (refer to FIGS. 4A to 4C) or by extracting a screen from the original image (refer to FIGS. 5A to 5C), an image of a partial area of the original image, for example, an image of the aspect ratio of 4:3, is extracted and displayed.

Figure 6A:
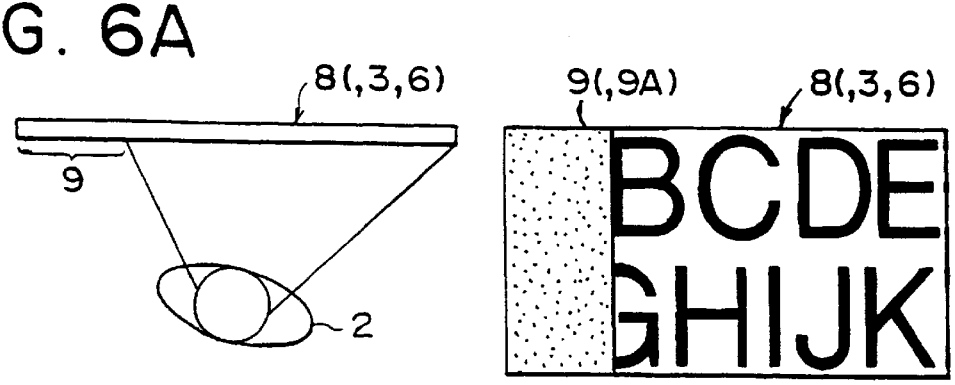
FIGS. 6A, 6B and 6C are schematic illustrations illustrating a relationship between a turning movement of the head of a viewer and a blanking display.
Figure 6B:
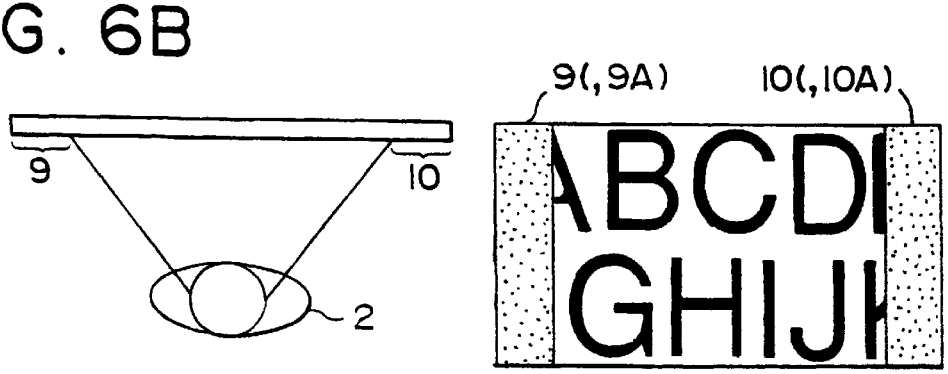
Figure 6C:
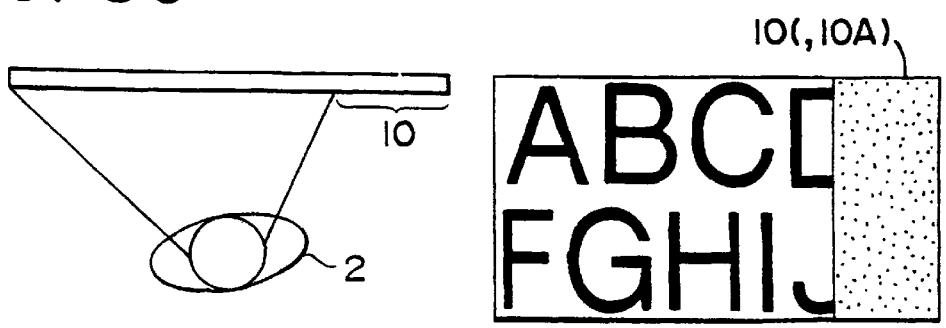

In this manner, by varying the widths of the left and right blanking portions 9 and 10 in response to an amount of movement of a turning movement of the head of the viewer 2 shown in FIGS. 1A and 1B or FIG. 3 or in response to an amount of movement when the screen display and the viewer are moved together with each other in the leftward or rightwardly direction without varying the viewing direction of the viewer shown in FIG. 2, an image region to be extracted from an original image is varied. For example, if the viewer 2 turns the head in the rightward direction as seen in FIG. 6A, the width of the blanking portion 9 on the left side is set comparatively wide while the width of the blanking portion 10 on the right side is set comparatively narrow or reduced to zero. If the head of the viewer 2 is directed just forwardly as seen in FIG. 6B, the widths of the left and right blanking portions 9 and 10 are set equal to each other. If the viewer 2 turns the head leftwardly as seen in FIG. 6C, then the width of the blanking portion 9 on the left side is set comparatively narrow or reduced to zero while the width of the blanking portion 10 on the right side is increased. Consequently, an image being displayed looks as if it were moving.

In any of the AV system 100 (refer to FIGS. 1A and 1B), the AV system 200 (refer to FIG. 2) and the AV system 300 (refer to FIG. 3), a movement of the entire body or a portion of the body of the viewer 2 is detected by means of a sensor, and an output of the sensor is inputted to a microcomputer, by which body movement information such as the direction, speed and amount (turning angle) of movement or turning movement and so forth is calculated. It is to be noted that the microcomputer may be provided at a suitable location on the display unit 3, 6 or 8 side or on the stereo headphone 4 side.

The body movement information calculated by the microcomputer is supplied commonly to the stereo headphone 4, which outputs sound to which audio processing has been performed, and the display unit 3, 6 or 8 which performs image processing.

Each of the display unit 3, 6 and 8 calculates, based on the body movement information, an image region to be extracted from an original image, and outputs a region designation signal which designates the calculated image region. The image region designated by the region designation signal is extracted from the original image and displayed on the display screen.

Simultaneously, the stereo headphone 4 forms a normal position of an audio image based on the body movement information and processes an audio signal so that an audio image which conforms to the image displayed on the display unit 3, 6 or 8 may be formed.

Subsequently, a construction of a display apparatus for performing the image processing described above will be described in detail.

Figure 7:
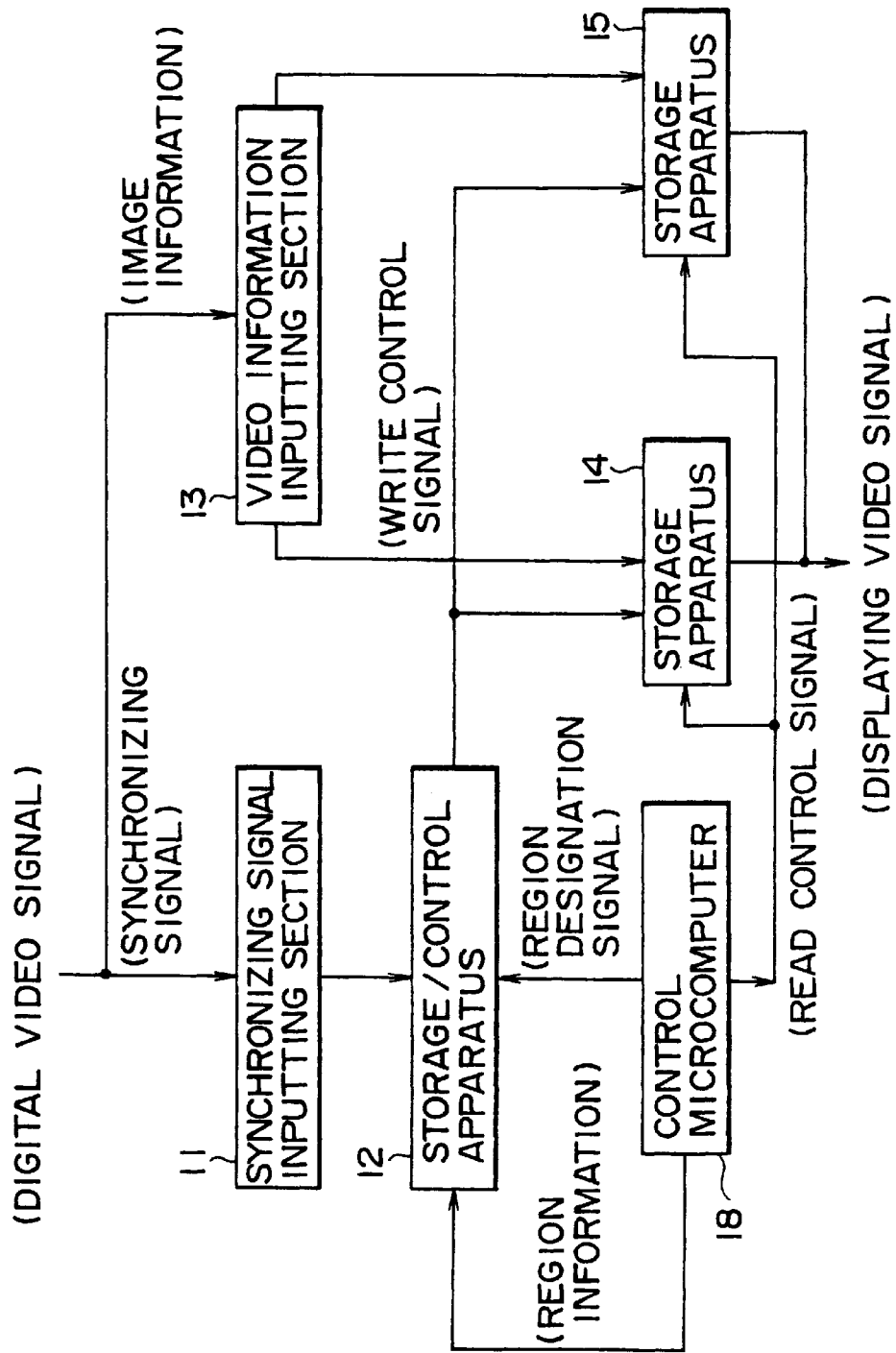
FIG. 7 is a block diagram showing a basic construction of an AV system to which the present invention is applied.

Referring to FIG. 7, there is shown a basic construction of a display apparatus for performing the image processing according to the present invention. The display apparatus shown includes a synchronizing signal inputting section 11, a storage/control apparatus 12, a video information inputting section 13, a pair of storage apparatus 14 and 15, and an image processing section 18.

The synchronizing signal inputting section 11 extracts a synchronizing signal from a digital video signal of an original image and outputs the synchronizing signal to the storage/control apparatus 12.

The storage/control apparatus 12 controls so that, each time a synchronizing signal is inputted thereto, image information may be written into one of the storage apparatus 14 and 15. Further, the storage/control apparatus 12 receives, simultaneously with the synchronizing signal, a region designation signal for controlling a region of the storage apparatus 14 or 15 into which video information is to be written based on region information from the image processing section 18 which calculates a turning movement amount of a turning angle and so forth.

The video information inputting section 13 receives image information of a digital video signal of an original image and outputs the image information to the storage apparatus 14 and 15.

Each of the storage apparatus 14 and 15 writes, when a write control signal is received from the storage/control apparatus 12, all of image information from the video information inputting section 13 or part of the image information designated by region information from the storage/control apparatus 12. It is to be noted that whether all or part of the image information is to be written depends upon a difference in construction, and this will be hereinafter described.

The image processing section 18 detects a turning movement amount of a turning angle of the head of a viewer and performs processing of an image based on the detected movement amount.

The image processing section 18 generates a read control signal for designating whether all of video information stored in the storage apparatus 14 or 15 or part of the video information which is in a region designated by a region designation signal from the storage/control apparatus 12 should be outputted. It is to be noted that whether all or part of the video information is to be outputted depends upon a difference in construction, and this will be hereinafter described.

The display apparatus having the construction described above with reference to FIG. 7 operates in the following manner.

In particular, when a synchronizing signal is inputted, the storage/control apparatus 12 sends a write control signal to the storage apparatus 14 to store video information. The storage/control apparatus 12 sends a read control signal to the storage apparatus 14 in response to a region designation signal which is generated simultaneously with a next synchronizing signal so that the stored video information may be outputted from the storage apparatus 14. The storage/control apparatus 12 simultaneously sends a write control signal to the storage apparatus 15 to write video information then into the storage apparatus 15. This sequence of operations is repeated for each synchronizing signal.

It is to be noted that, while the display apparatus shown in FIG. 7 is constructed such that a video signal to be displayed is extracted from video information stored in the storage apparatus 14 or 15 designating a region for such extraction, alternatively a video signal extracted from inputted video information designating a region for such extraction may naturally be stored into the storage apparatus 14 or 15. This will be described in "1. Processing of an ordinary digital video signal" given below.

In the following, transmission-reception of a digital signal which is employed in satellite broadcasting and so forth by the display apparatus having the basic construction as described above will be described in 1. Processing of an ordinary digital video signal and 2. Processing of a video signal of the MPEG2 format.

1. Processing of an Ordinary Digital Video Signal

Figure 8:
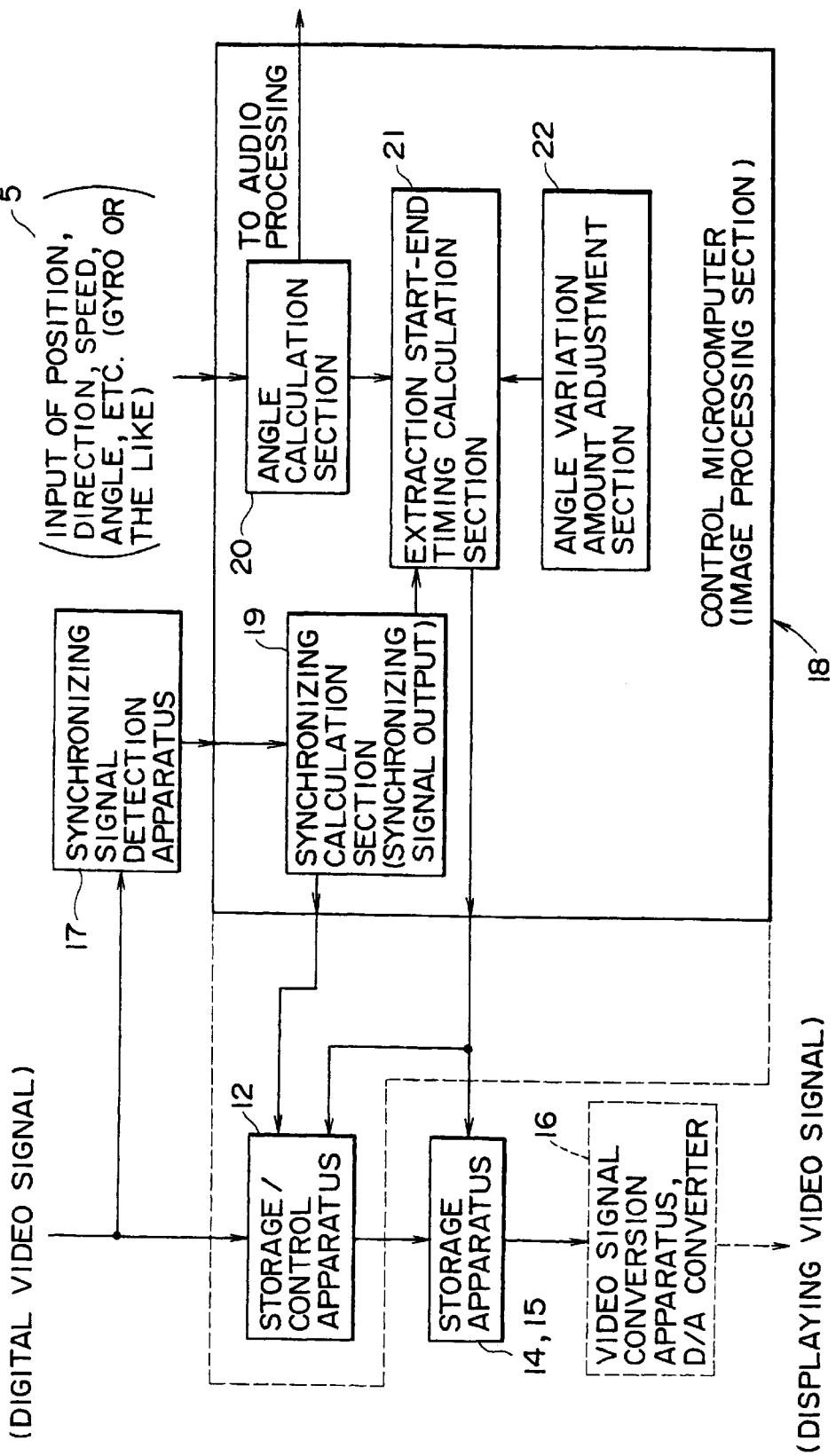
FIG. 8 is a block diagram showing an ordinary digital video signal processing apparatus.

An image processing apparatus which performs a method of processing an ordinary digital video signal is shown in FIG. 8. Referring to FIG. 8, the image processing apparatus includes a storage/control apparatus 12 and a pair of storage apparatus 14 and 15 described hereinabove, a video signal conversion apparatus 16 connected commonly to outputs of the storage apparatus 14 and 15, a synchronizing signal detection apparatus 17, a control microcomputer 18 serving as an image processing section which performs image processing. It is to be noted that the storage/control apparatus 12 may be included in the control microcomputer 18 as indicated by broken lines in FIG. 8.

The control microcomputer 18 service as an image processing section includes a synchronizing calculation section 19 for outputting a synchronizing signal, an angle calculation section 20, an extraction start-end timing calculation section 21, and an angle variation amount adjustment section 22 for adjusting an angle variation amount based on a screen size and an image-visual point distance. The control microcomputer 18 which includes the components just mentioned has a very high operation speed comparing with the period of a synchronizing signal of a video signal so that all required calculations can be completed within a time between two adjacent synchronizing signals.

The synchronizing calculation section 19 receives a synchronizing signal detected by the synchronizing signal detection apparatus 17 and outputs the received synchronizing signal to the storage/control apparatus 12 and the extraction start-end timing calculation section 21.

The angle calculation section 20 receives information of a position, a direction, a speed, an angle and so forth from the gyro sensor 5, calculates a turning angle of the head of the viewer 2 and a visual point movement distance, and outputs a result of the calculation, for example, to the stereo headphone 4 (refer to FIGS. 1A and 1B) via the extraction start-end timing calculation section 21 and the audio processing section not shown.

The extraction start-end timing calculation section 21 produces a region designation signal representative of an image region of an original image from which an image is to be extracted based on an angle signal calculated by the angle calculation section 20, that is, representative of timings of the start and the end for extraction, and outputs the region designation signal to the storage/control apparatus 12 and the storage apparatus 14 and 15. It is to be noted that writing and reading control into and from the storage apparatus 14 and 15 is omitted here since it is described hereinabove with reference to FIG. 7.

The angle variation amount adjustment section 22 calculates a correction value for an angle variation amount based on a screen size and a distance to the visual point of the viewer and outputs the calculated correction value to the extraction start-end timing calculation section 21.

Thus, a video signal in a region designated by a region designation signal outputted from the control microcomputer 18 serving as an image processing section having the construction described above is outputted from the storage apparatus 14 or 15 to the video signal conversion apparatus 16. In this instance, the following two sequences are available, and either one of the sequences may be employed. In particular, (1) the storage/control apparatus 12 stores video information of an original image as it is into the storage apparatus 14 or 15, and the storage apparatus 14 or 15 outputs the image information in a region designated by a region designation signal from the control microcomputer 18; or (2) the storage/control apparatus 12 stores video information only for an image region designated by region designation information from the control microcomputer 18 into the storage apparatus 14 or 15, and the storage apparatus 14 or 15 outputs the stored contents as they are.

In either case, since the image information outputted from the storage apparatus 14 or 15 is reduced in information amount comparing with that of the original image, either the information amount is compensated for by the video signal conversion apparatus 16 or information is outputted varying the reading speed of information from the storage apparatus 14 or 15. In this instance, depending upon the recording method, a synchronizing signal is either superposed or re-produced.

Since information outputted from the storage apparatus 14 or 15 is in the form of a digital signal, if necessary, the video signal conversion apparatus 16 is provided with a digital to analog conversion function.

The display image signal outputted from the video signal conversion apparatus 16 is sent via an image signal processing circuit not shown to and displayed on the display unit.

2. Processing of a Video Signal of the MPEG2 Format

Figure 9:
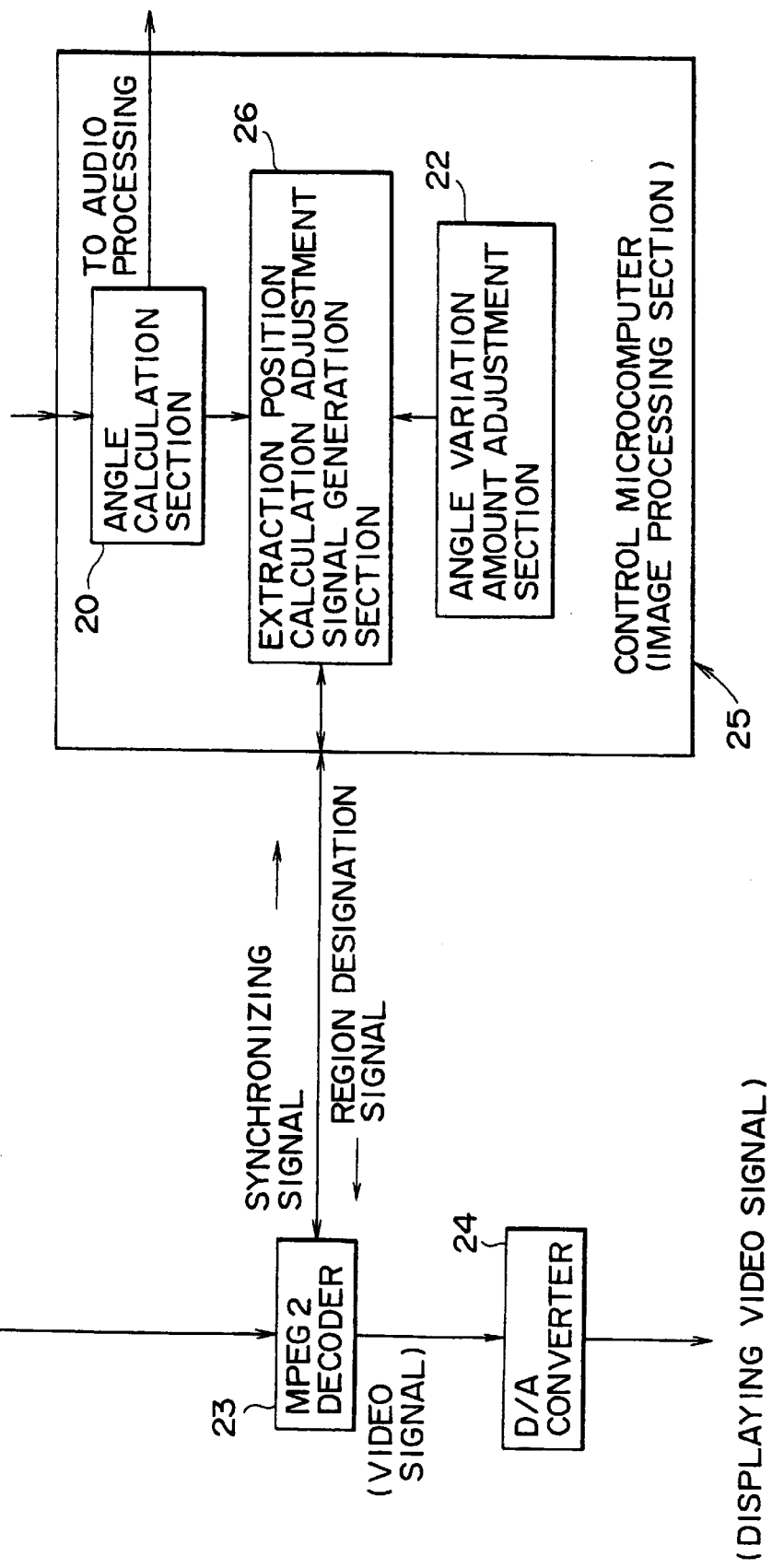
FIG. 9 is a flow diagram showing a processing apparatus for a video signal of the MPEG2 format.

Referring to FIG. 9, a processing apparatus for a video signal of the MPEG2 format includes an MPEG2 decoder 23, a digital to analog (D/A) converter 24, and a control microcomputer 25 serving as an image processing section for performing image processing.

The control microcomputer 25 for performing image processing receives, similarly to the control microcomputer 18 described hereinabove with reference to FIG. 8, information of a position, a direction, a speed, an angle and so forth from the gyro sensor 5, calculates a turning angle of the head of a viewer 2 and a visual point movement distance, and outputs a result of the calculation, for example, to a stereo headphone 4 (refer to FIGS. 1A and 1B) via the extraction start-end timing calculation section 21 and the audio processing section not shown.

The control microcomputer 25 includes an angle calculation section 20, an extraction position calculation adjustment signal generation section 26, and an angle variation amount adjustment section 22 for adjusting an angle variation amount based on a screen size and an image-visual point distance. The extraction position calculation adjustment signal generation section 26 calculates an extraction start position of a video signal from an original image based on angle information from the gyro sensor 5 or the like calculated by the angle calculation section 20, and outputs the extraction start position as a region designation signal to the MPEG2 decoder 23. The extraction start position can be selected arbitrarily from among start and end positions at which the original image is divided into 256 segments.

The processing apparatus for a video signal of the MPEG2 format having the construction described above with reference to FIG. 9 operates in the following manner.

Video information of the MPEG2 format included in information inputted as a result of reproduction of a package medium or reception of a broadcast is inputted to the MPEG2 decoder 23 while audio information is supplied, for example, to the stereo headphone 4 (refer to FIGS. 1A and 1B) which outputs sound as hereinafter described.

While a header part of the MPEG2 format inputted to the MPEG2 decoder 23 includes region designating information for cutting out an image of the aspect ratio of 4:3 from image information of the aspect ratio of 16:9, contents of the region designating information are not used by the present processing apparatus, but a region designation signal produced by the control microcomputer 25 is written into the place for the region designating information.

A video signal in a region designated by the region designation signal is outputted from the MPEG2 decoder 23. The video signal is converted into an analog signal by the digital to analog converter 24 and then sent as a displaying video signal to the display section not shown. As a result, the image in the designated region is displayed on the display section.

Subsequently, the audio processing section will be described.

The audio processing section is a modification to and is different from the audio processing section disclosed in Japanese Patent Laid-Open Application No. Heisei 7-95698 mentioned hereinabove in that information of a movement or a turning movement of a viewer is supplied from the angle calculation section 20 (refer to FIG. 8 or 9) of the video processing section described hereinabove. Thus, since detailed description is given in the document mentioned above, only an outline of the audio processing section will be described with reference to FIG. 10 in which a very simplified block diagram is shown.

Figure 10:
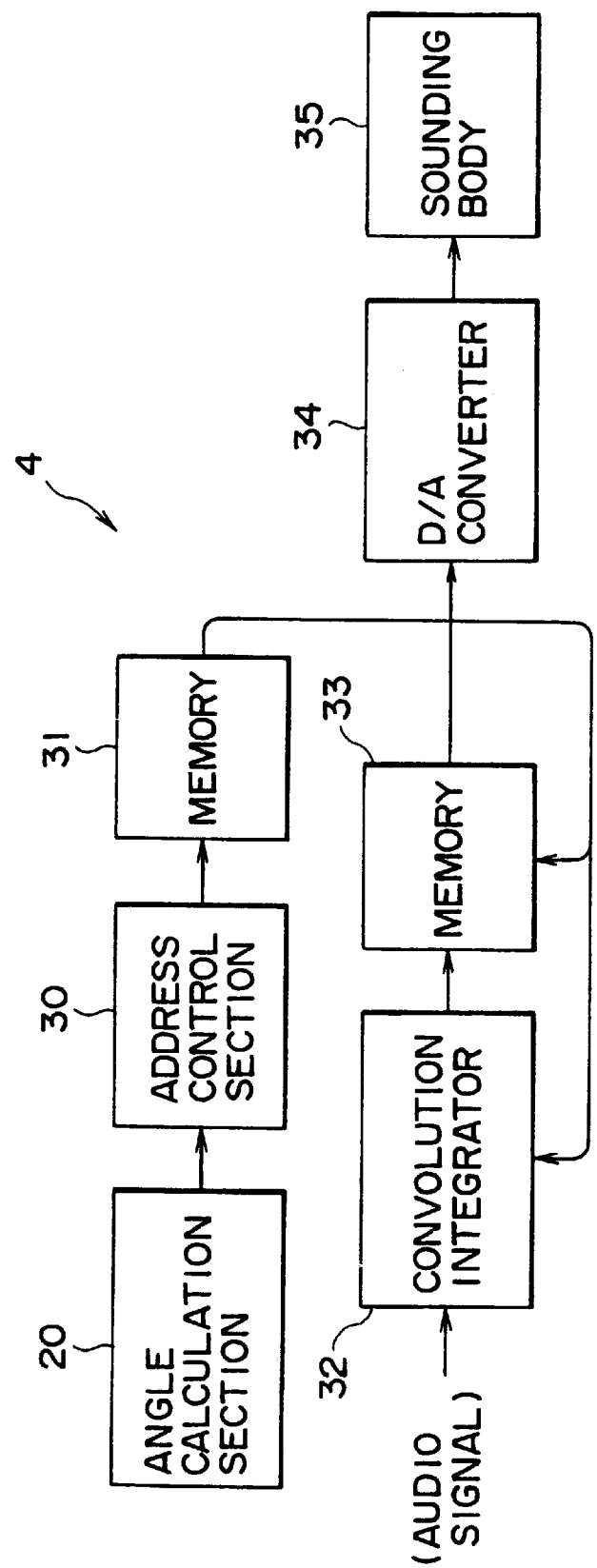
FIG. 10 is a block diagram showing a basic construction of an audio processing apparatus incorporated commonly in the AV apparatus of FIGS. 1A and 1B to 3.

Referring to FIG. 10, the audio processing apparatus is constructed, for example, as a stereo headphone 4 and generally includes an address control section 30, a memory 31, a convolution integrator 32, another memory 33, a digital to analog (D/A) converter 34 and a sounding body 35.

The address control section 30 receives an angle signal outputted from the angle calculation section 20 described hereinabove (refer to FIG. 8 or 9) and designates an address of the memory 31 based on the received angle signal. The angle and the address are coordinated in a one-by-one corresponding relationship. Where a common means is used for detecting a turning angle and so forth to be used for video processing and audio processing, that is, for detecting variation amounts in movement and/or turning angle of the entire body or part of the body of a viewer in such a manner as described above, the viewer is prevented from feeling a fluctuation in detection amount which arises from a dispersion of a part such as a gyro sensor or a temperature.

A correspondence table between the angle and the impulse response is stored in the memory 31. The impulse response represents a virtual sound source position with respect to a reference direction of the head of a viewer. Accordingly, in response to an angular position of the head, an impulse response signal representative of a virtual sound source position conforming to the direction of an image is outputted from the memory 31.

The impulse response signal is supplied to the convolution integrator 32 and the memory 33. The convolution integrator 32 and memory 33 convolutionally integrate the impulse response signal with respect to an audio signal inputted thereto to produce an audio signal representative of an audio image having a normal position set in response to the angle of the head and outputs the audio signal to the digital to analog converter 34.

The audio signal is converted into an analog signal by the digital to analog converter 34 and supplied to the sounding body 35, from which it is supplied as sound to the ears of the viewer.

While description overlaps, an image is extracted from an original image and displayed such that, as shown in FIGS. 4A to 4C or 5A to 5C, with reference to a center position P with reference to which the original image is to be displayed on the screen, a moved position Q with respect to the current screen is calculated, for example, from a movement amount of a turning angle of the head, and the original image is displayed cutting away images at the opposite left and right end portions thereof with reference to the moved position Q.

The image portion after the images at the end portions are cut away may be displayed with the cut away images blanked as at the blanking portions 9 and 10 as seen in FIGS. 4A to 4C or may be displayed by extracting the same as seen in FIGS. 5A to 5C.

In particular, ① if the turning angle of the head exhibits a movement amount in the leftward direction, then the moved position Q is present leftwardly of the center position P, and the original image from which the image portion 10 or 10A at the right end portion thereof is removed is displayed as an image. ② If the turning angle of the head exhibits no movement amount and the head is directed just to the screen, then the center position P and the moved position Q are the same as each other, and the original image from which the image portions 9 and 10 or 9A and 10A at the left and right end portions thereof are removed is displayed as an image. ③ If the turning angle of the head exhibits a movement amount in the rightward direction, then the moved position Q is present rightwardly of the center position P, and the original image from which the image portion 9 or 9A at the left end portion thereof is removed is displayed as an image.

The center position P is the center position of an extracted image and also the center position for audio processing, and the moved position Q indicates a normal position of an audio image with respect to the center position P of the image. Accordingly, if the positions P and Q shown in FIG. 4B or 5B are made coincide with each other, then sound which follows up a varied image can be obtained.

It is to be noted that, while only those elements for a right audio signal are shown in FIG. 10, a convolution integrator 32, a memory 33, a digital to analog converter 34 and a sounding body 35 are provided also for a left audio signal and the impulse response signal from the memory 31 is supplied to the convolution integrator 32 and the memory 33.

While the present invention is described above in connection with the preferred embodiments thereof, the present invention is not limited to the specific embodiments, and according to the present invention, by varying a display screen to be displayed from an original image in response to a movement of a part of the body of a viewer such as a movement of the eye-balls or a movement of the entire body and varying the sound in response to the thus varied screen, where an apparatus which includes a headphone which can vary an audio image position such as a headphone known under the trade name of, for example, ORBIT or Virtualphone and an MPEG2 decoder chip is used, a system can be constructed only if software is modified suitably. Also it is possible to construct a virtual real space.

Further, an operation screen may be provided at an end portion of a screen of a screen display unit such as, for example, a television receiver, such that, by detection of a turning angle of the head of a viewer, a screen for setting or changing can be observed while the eye-balls are observing the operation screen on the screen.

Further, if a sensor for detecting a visual point position on a screen is provided, then an operation screen provided at an end portion of the screen for performing setting or changing of the screen can be operated simply by a movement of the eye-balls.

Further, since screen and audio processing is performed in a synchronized relationship with a movement of the body of a viewer, a possible bad influence upon the body can be reduced.

Furthermore, since screen and audio processing is performed in a synchronized relationship with a movement of the body of a viewer, the display apparatus can be utilized also for such media as a DSS (Digital Satellite System), a DVD (Digital Video System) and DVB (Digital Video Broadcasting) and for control of a game by making effective use of angle information used for a movement of a video image or an audio image.

Having now fully described the invention, it will be apparent to one of ordinary skill in the art that many changes and modifications can be made thereto without departing from the spirit and scope of the invention as set forth herein.

What is claimed is:

1. A display apparatus operable in a synchronized relationship with a movement of the body of a viewer, comprising:

display means for displaying a portion of an original image on a screen;

angle calculation means including means for detecting one of a movement amount and a turning angle of a part of the body of a viewer of said display means;

video processing means for extracting a portion of said original image in response to one of said movement amount and said turning angle and supplying said extracted portion of said original image to said display means;

audio reproduction means; and audio processing means connected to said audio reproduction means for processing an audio signal in response to one of said movement amount and said turning angle calculated by said angle calculation means so that sound is output from a position corresponding to said portion of said original image extracted by said video processing means, wherein said audio processing means includes:

storage means connected to said angle calculation means for storing a table correlating said turning angle to an impulse response representing a virtual sound source position, and convolution integrator means connected to said storage means for convolutionally integrating said impulse response with said audio signal.

2. A display apparatus according to claim 1, wherein the original image is obtained by reproduction of a compressed digital video signal, and said image processing means decodes a portion of the digital video signal to extract the portion of the original image.

3. A display apparatus according to claim 1, wherein said display means includes a head mounted display unit.

4. A display apparatus according to claim 3, wherein said detection means includes a gyro sensor.

5. A display apparatus according to claim 1, wherein said display means includes a head mounted display unit, and said audio reproduction means includes a headphone.

6. A display apparatus according to claim 5, wherein said detection means includes a gyro sensor.

7. A display apparatus according to claim 1, wherein said display means includes a projector.

8. A display apparatus according to claim 1, wherein said display means blanks any other portion of the original image than the portion to be displayed in order to extract the portion to be displayed.

9. A display apparatus according to claim 1, wherein said detection means detects a movement amount or a turning angle of the head of the viewer.

* * * * *